United States Patent
Schiesser et al.

[11] Patent Number: 5,810,158
[45] Date of Patent: Sep. 22, 1998

[54] BELT ACCUMULATION CONVEYOR

[75] Inventors: Ricardo N. Schiesser, Grandville; James C. Burrous, Muskegon, both of Mich.

[73] Assignee: Mannesmann Dematic Rapistan Corp., Grand Rapids, Mich.

[21] Appl. No.: 576,332

[22] Filed: Dec. 21, 1995

[51] Int. Cl.⁶ .................................................. B65G 15/00
[52] U.S. Cl. ...................................... 198/809; 198/460.1
[58] Field of Search ................................... 198/721, 725, 198/809, 718, 460.1

[56] References Cited

U.S. PATENT DOCUMENTS

| | | |
|---|---|---|
| 3,104,007 | 9/1963 | Swezey et al. . |
| 3,545,588 | 12/1970 | Corley . |
| 3,550,753 | 12/1970 | Culp . |
| 3,934,707 | 1/1976 | Bowman . |
| 3,951,254 | 4/1976 | Juhrend . |
| 4,149,626 | 4/1979 | Holt . |
| 4,511,030 | 4/1985 | Lem . |
| 4,658,947 | 4/1987 | Welder . |
| 4,732,265 | 3/1988 | vom Stein . |
| 5,125,497 | 6/1992 | Sündermann . |
| 5,685,414 | 11/1997 | Nerenhausen .......................... 198/809 |

FOREIGN PATENT DOCUMENTS

| | | |
|---|---|---|
| 0392621B1 | 6/1992 | European Pat. Off. . |
| 2505451 | 8/1976 | Germany . |
| 2727638A1 | 12/1978 | Germany . |
| 3045563A1 | 7/1982 | Germany . |
| 3046154A1 | 7/1982 | Germany . |
| 4203683A1 | 8/1993 | Germany . |
| 2187156 | 9/1987 | United Kingdom . |

OTHER PUBLICATIONS

Product brochure entitled "Model 68 CCA Plastic Belt Conveyor and Model 70 CCAC Plastic Belt Conveyor Curve (Zero–Pressure Accumulating Type)" published by Hytrol Conveyor Company, Inc. in the United States, publication date unknown.

Product brochure entitled "MASYC Airlane Accumulating Belt Conveyor Model AL," published by MASYC Southern Corporation in the United States, publication date unknown.

Search Report from corresponding European Application No. EP 96 25 0298.

*Primary Examiner*—Joseph E. Valenza
*Attorney, Agent, or Firm*—Van Dyke, Gardner, Linn & Burkhart, LLP

[57] ABSTRACT

A belt accumulation conveyor includes at least one driven endless conveying member defining a conveying surface and at least one brake surface lateral of the endless conveying member. A plurality of longitudinal members are arranged in tandem, defining a plurality of accumulation zones. Each of the longitudinal members vertically reciprocates a portion of either the conveying surface or the brake surface. A portion of the conveying surface is elevated above the brake surface to convey objects in that zone and a portion of the brake surface is elevated above the conveying surface to accumulate objects in that zone. A plurality of such actuators are provided and each is operatively connected with adjacent ends of adjacent ones of the longitudinal member. In this manner, the respective adjacent ends can be selectively raised and lowered together.

67 Claims, 8 Drawing Sheets

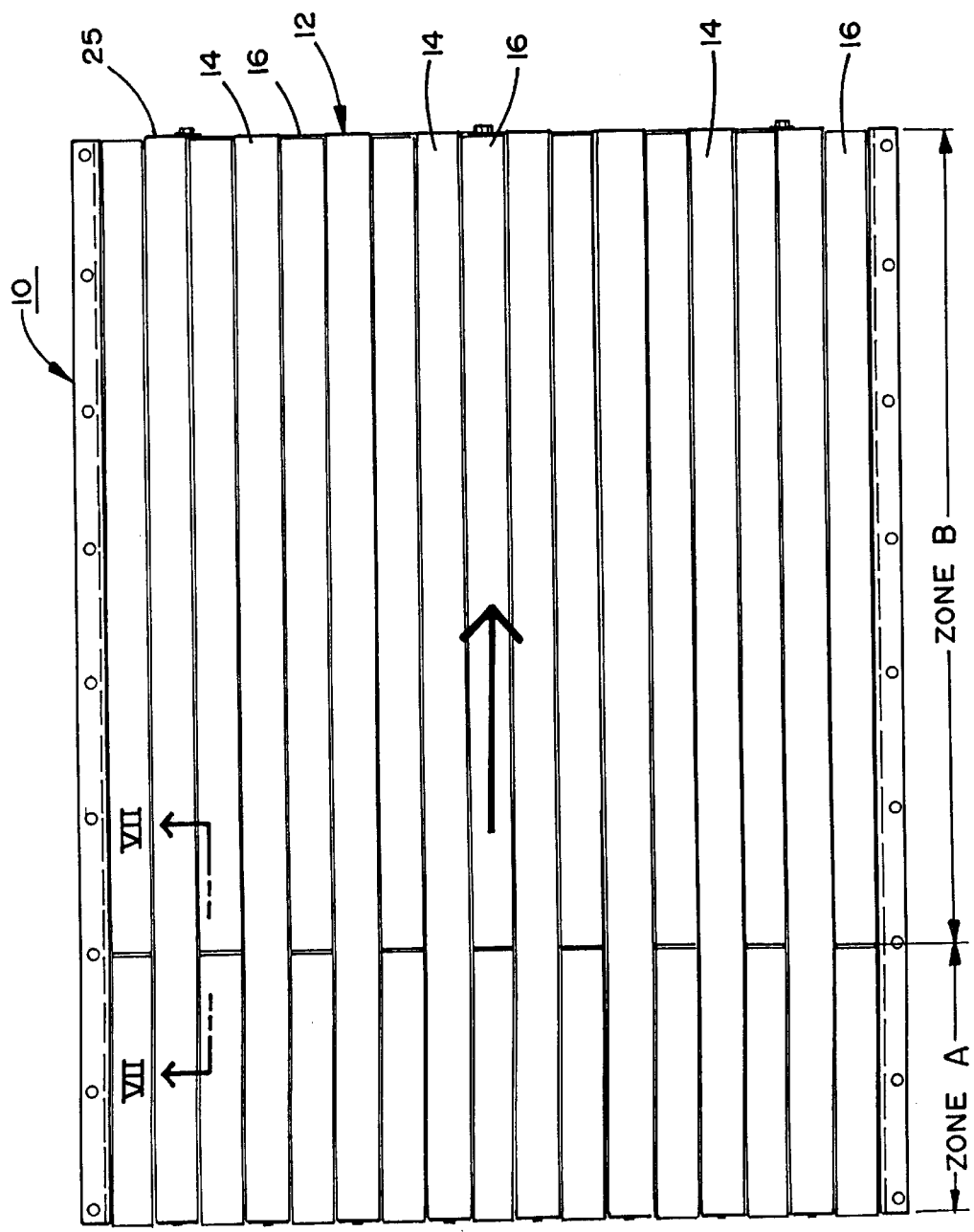

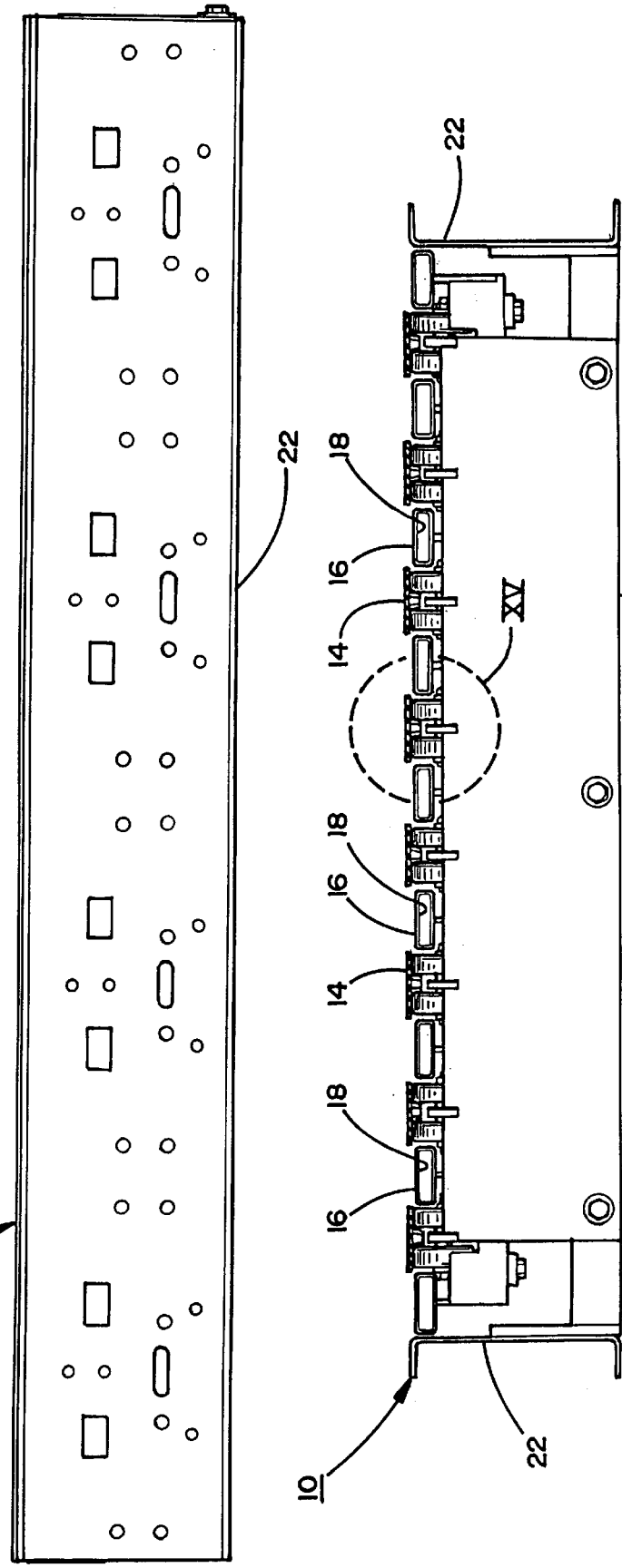

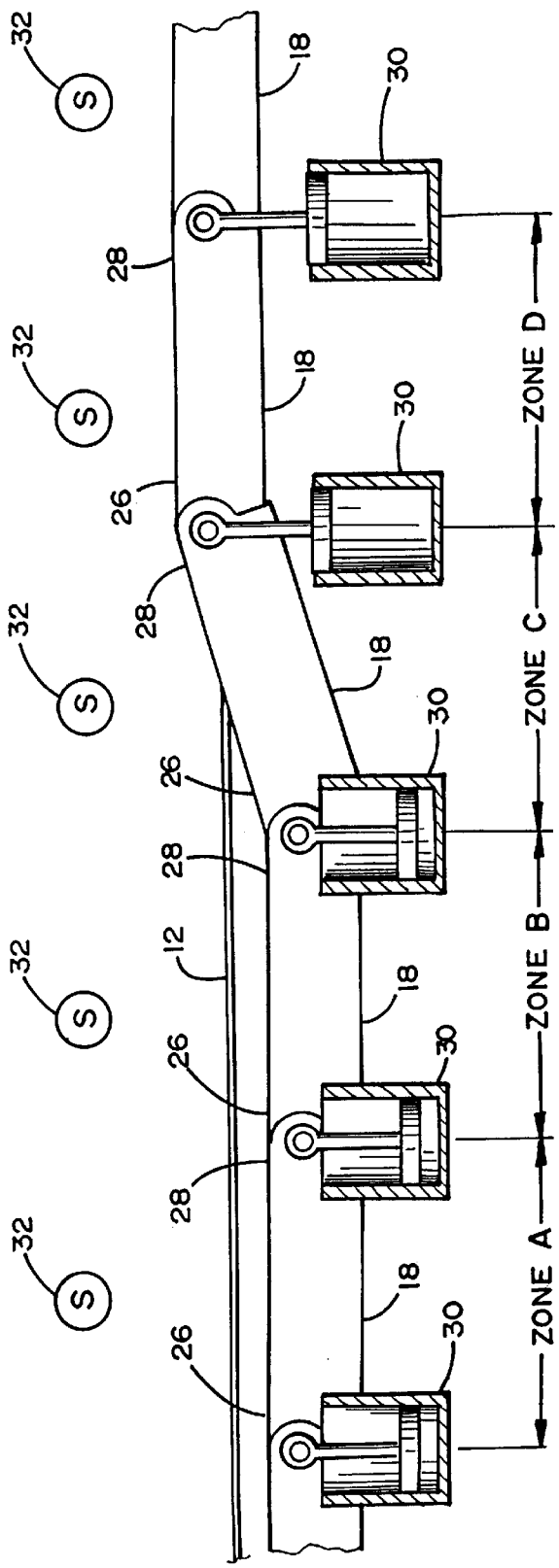
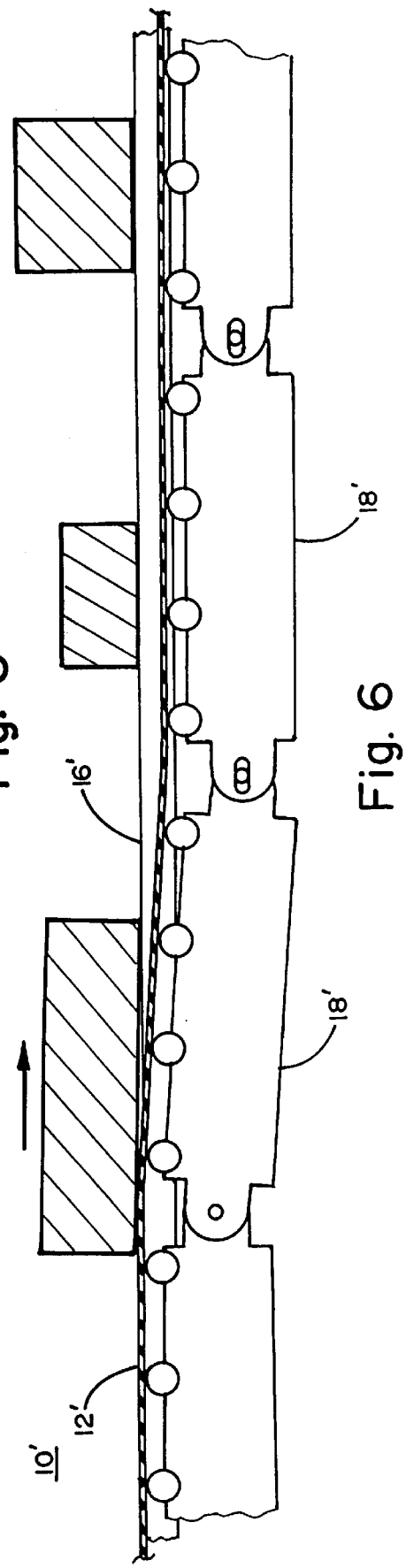
Fig. 5
Fig. 6

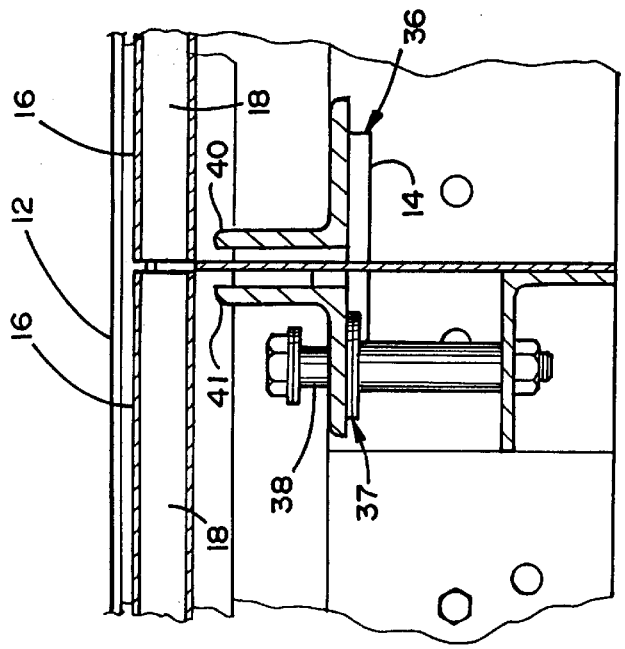
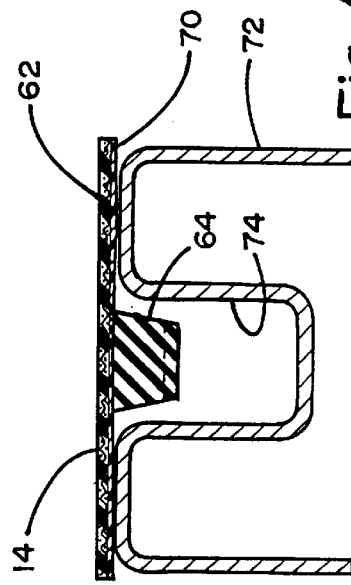
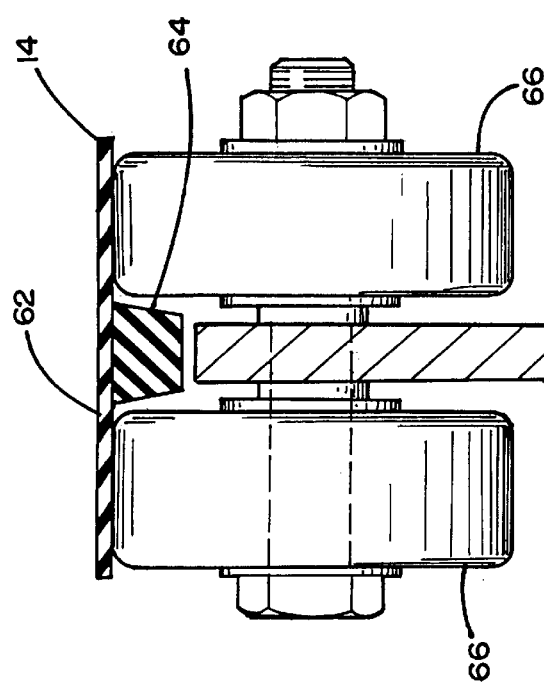

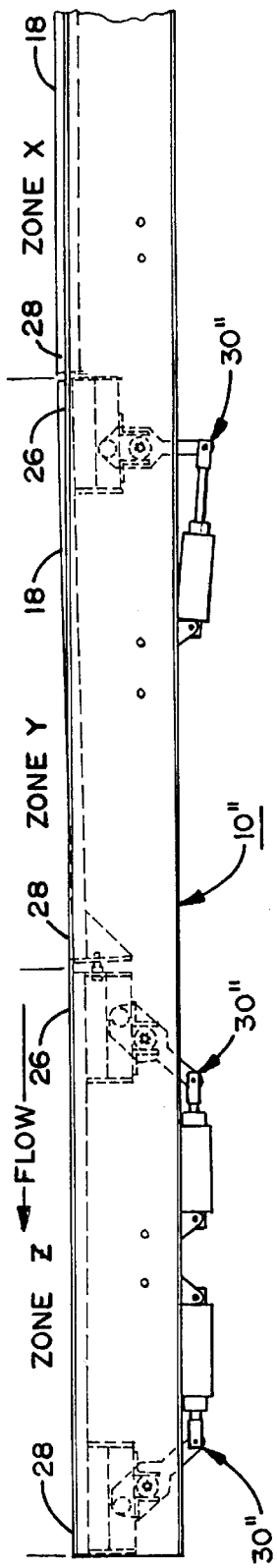
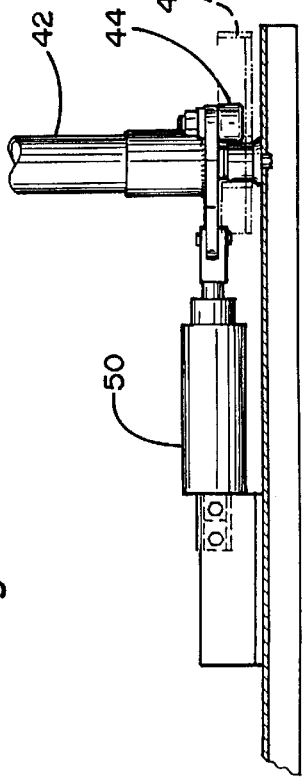
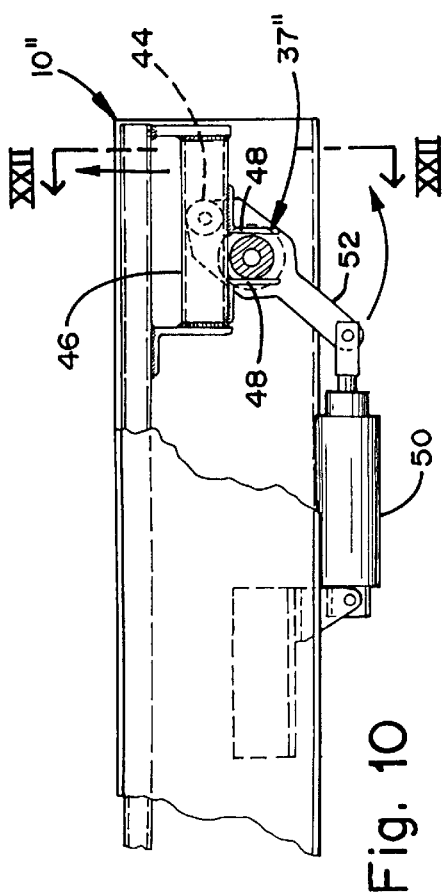
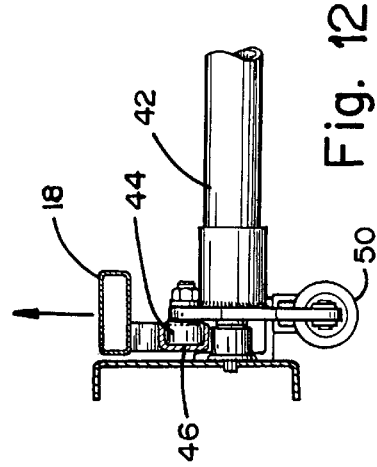
Fig. 8
Fig. 11
Fig. 12
Fig. 10

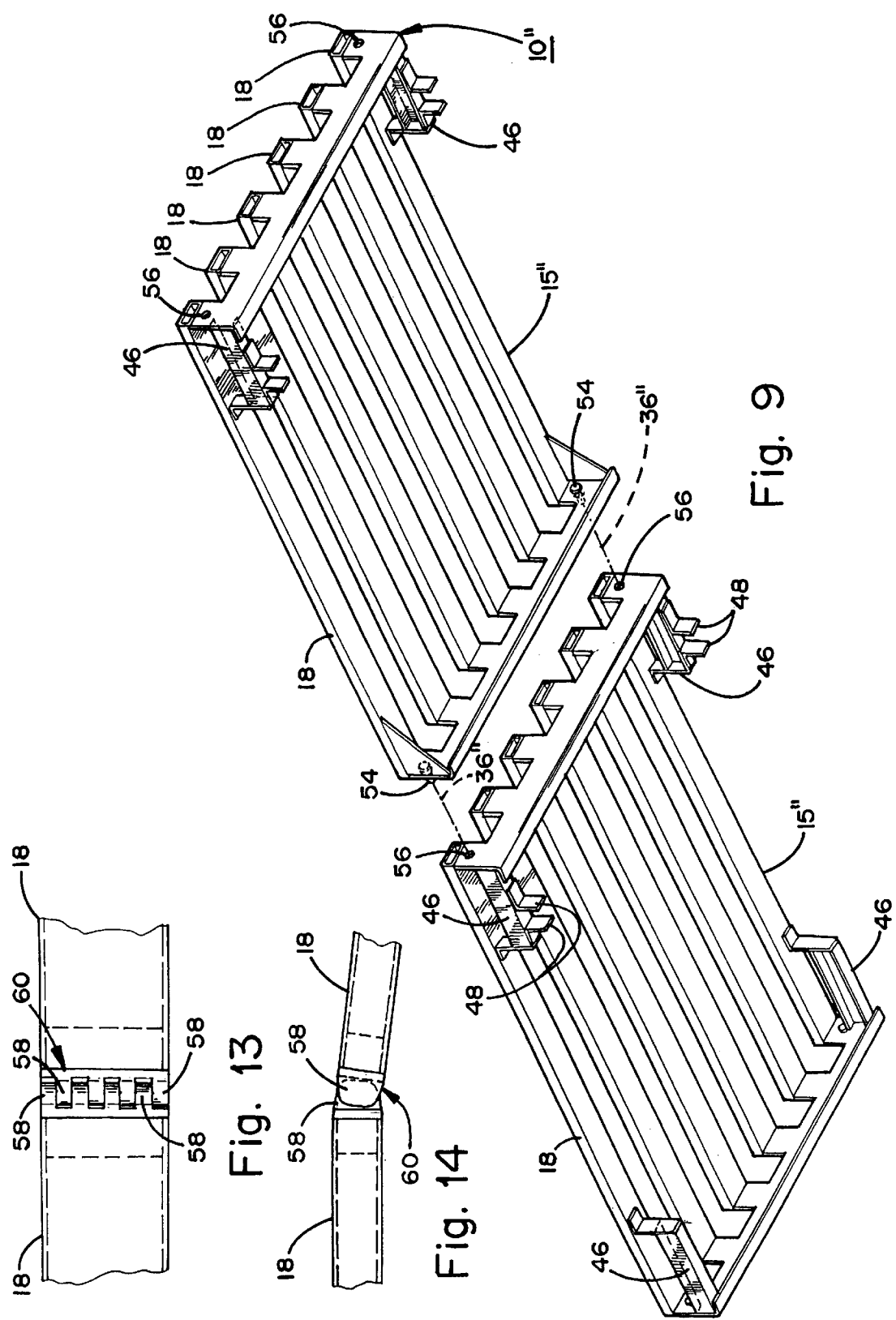

BELT ACCUMULATION CONVEYOR

BACKGROUND OF THE INVENTION

This invention relates generally to accumulation conveyors and, more particularly, to belt accumulation conveyors in which objects are conveyed by the upper portion of an endless conveying member and accumulated by being elevated above said conveying surface.

Accumulation conveyors generally fit into one of two categories: roller accumulation conveyors and belt accumulation conveyors. Belt accumulation conveyors include two general types: one in which a conveying surface is lowered and objects come to rest on support brake longitudinal members and another type in which support brake longitudinal members raise objects above a conveying member.

Roller accumulation conveyors are commonly utilized in conveyor systems for selective accumulation of objects in the system. A roller accumulator includes a multiplicity of parallel roller elements which are selectively driven by actuation of one or more drive members. The most common form of drive member is an endless belt or padded chain member under the rollers which is selectively elevated, typically in zones, by actuators in order to bring the drive member into contact with the rollers, from underneath, in one or more zones and, thereby, drive the zone. Actuators retract the drive member away from the rollers in an accumulation mode in order to allow the rollers in the zone to be free-wheeling to accumulate articles, or objects. When equipped with suitable controls, such roller accumulation conveyor provides satisfactory accumulation of objects in flat bottom totes, sturdy boxes or palletized loads. It can be controlled in a manner which significantly reduces line pressure between accumulated objects and is relatively inexpensive to manufacture and install.

Roller accumulation conveyors may not be suitable for all applications. Objects which are very light, or are small and irregularly shaped, or comprise loosely wrapped packages, may not be adequately handled by roller accumulation conveyors. The object may fall through or get stuck between rollers. Some packages may get shaken apart by vibration as they pass over the rollers. Furthermore, the roller accumulation conveyor usually does not work well on upward or downward inclines. Furthermore, although line pressure is reduced, it is not necessarily eliminated in all circumstances.

Belt accumulation conveyors do not have the same limitations in application as do the power roller accumulators. Belt accumulation conveyors include one or more endless conveying elements, the upper surface, or surfaces, of which define a conveying surface interspersed with one or more elevation/braking surfaces capable of selectively supporting objects above the conveying surface. An actuator provides selective relative elevational movement between the braking surface and the conveying surface. When the braking surface is above the conveying surface, articles are arrested on the braking surface and accumulate. When the braking surface is below the conveying surface, articles are conveyed. The actuator may be divided into tandem zones in order to allow selective accumulation of objects along an elongated conveying surface. The belt conveying surface avoids damage to most objects and functions adequately on both inclines and declines. Furthermore, there is no back pressure between objects because the objects are in positive frictional engagement with either the conveying surface or the braking surface.

Belt accumulation conveyors have met with only limited commercial success. In one belt accumulation conveyor disclosed in U.S. Pat. No. 3,934,707 issued to Applicant's assignee for BELT ACCUMULATORS, inflatable elongated tube members seated beneath support ways, or braking surfaces, selectively elevate the braking surfaces above stationary mounted, driven endless belt members, which define the conveying surface. Multiple sets of braking surfaces are arranged in tandem in order to define a plurality of accumulation zones. In order to ensure proper actuation of the tube-like members, mechanical linkages interconnect pneumatic control systems associated with each zone. Objects may inadvertently propel into the next downstream zone prior to being arrested. If the downstream zone is in an accumulation mode, this may result in a collision between the propelled object and the upstream end of the actuator structure supporting the braking surface. Such collision may not only damage the colliding object, but may cause a general jamming of the accumulator requiring system shutdown.

One proposal to overcome the above-described difficulties has been to provide stationary braking surfaces and to reciprocate the belt members in order to provide for selective accumulation and conveying of objects. This is accomplished by mounting the plurality of conveying belts on a common frame which is vertically reciprocated as guided by guide members. Such proposed solution may not serve to avoid all collisions between objects on the belt accumulator. Additionally, after some conveying members are lowered, and objects come to rest on the support brake longitudinal members, portions of the conveying belt may rub the bottom of the accumulated object putting marks on, and otherwise defacing, the object. Accordingly, a long-felt need exists for a belt accumulation conveyor which is reliable in operation, and avoids failure modes that result in crashes and jamming of conveyed objects.

SUMMARY OF THE INVENTION

The present invention provides a belt accumulation conveyor which overcomes the difficulties of the prior art. This is accomplished, according to an aspect of the invention, in an accumulation conveyor having at least one driven endless conveying member defining an upper conveying surface and at least one brake surface lateral of the endless conveying member. A plurality of longitudinal members are arranged in tandem, define a plurality of accumulation zones. Each of the longitudinal members vertically reciprocates a portion of either the conveying surface or the brake surface. Each longitudinal member selectively elevates a portion of the conveying surface above the brake surface to convey objects in that zone and selectively elevates a portion of the brake surface above the conveying surface to accumulate objects in that zone. A plurality of actuators are provided. Each is operatively connected with adjacent ends of adjacent ones of the longitudinal member in order to selectively raise and lower the respective adjacent ends together.

The longitudinal member may vertically reciprocate a portion of each of the brake surface. The driven endless conveying member fixedly mounted to a frame. However, it is also possible to apply the actuators to the endless conveying member in combination with stationary brake surfaces.

An accumulation conveyor, provided according to the invention, does not present an abrupt surface of a member to an article traveling along the conveying surface, which an object could collide with, even if an object is propelled inadvertently into a downstream zone in an accumulation mode or if a failure occurs in one of the control components.

This avoids damage to conveyed objects, as well as crashes which may force the shutdown of the conveyor system.

According to another aspect of the invention, an accumulation conveyor is composed of multiple endless belts running the full length of the conveyor with multiple brake assemblies arranged in tandem zones along the conveyor. Each brake assembly includes a plurality of brake surfaces defined by the upper surfaces of a plurality of longitudinal members interspersed between the belts and rigidly interconnected to operate as a unit. Adjacent brake assemblies are articulated, in a hinged manner, so that adjacent ends of the brake assemblies are raised together by a common actuator. At rest, the brake assembly's top brake surface is just below the conveying surface of the belt members to convey objects through that zone. When actuated, the downstream end of the brake assembly is elevated so that the brake surface is just above the conveying surface of the belt presenting a ramp to oncoming objects, lifting objects off of the belt to accumulate. The ramp allows objects to slide gently onto the uplifted zone without sustaining appreciable shock. When sensors determine that the object is in that zone, the upstream actuator is operated causing the entire brake surface for that zone to be elevated.

According to another aspect of the invention, an actuator for adjacent ends of the brake assemblies is a laterally extending torque tube which is straddled by vertical flanges in order to restrain fore and aft motion of the assembly. A member, such as a cam follower, on a lever arm engages a channel on the frame in order to lift that portion of the frame when the torque tube is rotated by a pneumatic cylinder, hydraulic cylinder, or electrical solenoid or motor.

According to yet another aspect of the invention, ends of the longitudinal members are overlapping in order to present a continuous surface to oncoming objects. This reduces the likelihood that objects will be torn or dropped between the members. In a most preferred form, the overlapping ends are in the form of a knuckle joint made up of interlaced fingers on the adjacent ends of the longitudinal members. The knuckle joint accommodates fore and aft movement between the longitudinal members, which occurs in small amounts as the interface is actuated.

These and other objects, advantages, and features of this invention will become apparent upon review of the following specification in conjunction with the drawings.

BRIEF DESCRIPTION OF THE DRAWINGS

FIG. 2 is a top plan view of the accumulation conveyor in FIG. 1;

FIG. 3 is a side elevation of the accumulation conveyor in FIG. 1;

FIG. 4 is an end elevation of the accumulation conveyor in FIG. 1;

FIG. 5 is a schematic diagram illustrating operating of the invention;

FIG. 6 is the same view as FIG. 5 of an alternative embodiment of the invention;

FIG. 7 is a sectional view taken along the lines VII—VII in FIG. 2;

FIG. 8 is a side elevation of an alternative embodiment of a belt accumulation conveyor according to the invention;

FIG. 9 is a bottom perspective view of the belt accumulation conveyor in FIG. 8 with portions removed in order to illustrate details thereof;

FIG. 10 is an enlarged side elevation of the belt accumulation conveyor in FIG. 8;

FIG. 11 is a top plan view of the belt accumulation conveyor in FIG. 10;

FIG. 12 is a sectional view taken along the lines XII—XII in FIG. 10;

FIG. 13 is a top plan view of a knuckle joint according to the invention;

FIG. 14 is a side elevation of the knuckle joint in FIG. 13;

FIG. 15 is an enlarged end elevation of area XV—XV in FIG. 4;

FIG. 16 is the same view as FIG. 15 of an alternative embodiment; and

DESCRIPTION OF THE PREFERRED EMBODIMENT

Figure 1:
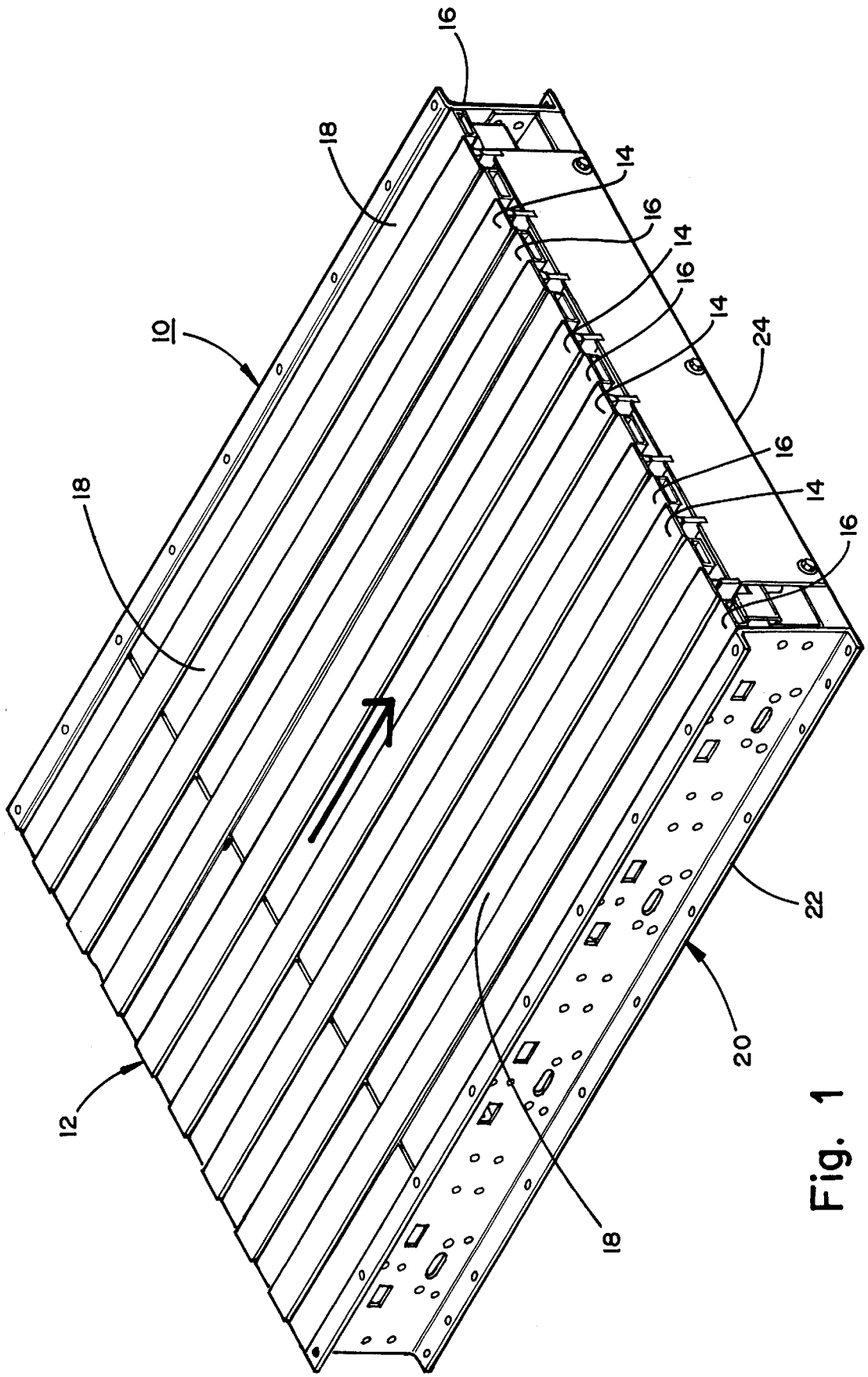
FIG. 1 is a perspective view of a belt accumulation conveyor according to the invention.
Figure 17:
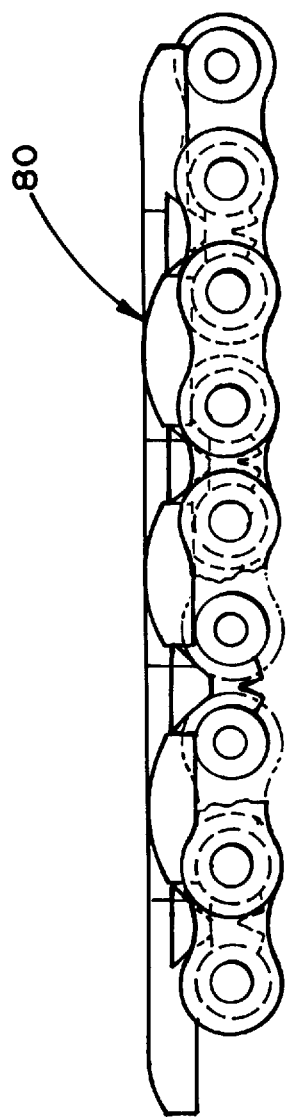
FIG. 17 is a side elevation of a padded chain useful with the invention.

Referring now the drawings and the illustrative embodiments depicted therein, a belt accumulation conveyor 10 includes a conveying surface 12 defined by the upper surface of one or more endless conveying members 14 which are reeved by suitable support and driven by drive means (not shown). In the illustrated embodiment, endless member 14 may be any reinforced multiple conveyor belt such as a drive belt of the type disclosed in commonly assigned U.S. Pat. No. 5,554,323, for a MODULAR PNEUMATIC ACCUMULATION CONVEYOR, the disclosure of which is hereby incorporated herein by reference. Alternatively, endless drive member 14 may be a padded chain 80 (FIG. 17) of the type disclosed in U.S. Pat. No. 4,458,809 for a PADDED CHAIN CONVEYOR SYSTEM or other type of an endless drive member. Belt accumulation conveyor 10 further includes one or more brake, or elevating, surfaces 16, each of which, in the embodiment illustrated in FIG. 1, is defined by the upper surface of an elongated longitudinal member 18. Endless conveying member or members 14 and elongated longitudinal member or members 18 are supported by a frame 20 defined by a pair of side members 22 and a plurality of lateral support members 24. Although referred to as a brake surface, surface 16 may be a high-friction surface, a low-friction surface, or a medium-friction surface depending upon the requirements of the particular application. The number of endless conveying members and brake surfaces are also a function of the particular application. In the illustrated embodiment, a plurality of longitudinal members 18 are spaced laterally across conveyor 10, interlaced with a plurality of drive members 14, and fixed together in a brake assembly 15.

As best seen by reference to FIGS. 5 and 8, elongated longitudinal members 18 are arranged in tandem in zones with each elongated actuator member defining one zone. Each longitudinal member 18 has a first end 26 and an opposite second end 28. End 26 of one longitudinal member is commonly actuated with end 28 of the adjacent longitudinal member by an actuator 30. In the illustrated embodiment, actuator 30 is illustrated as a pneumatic cylinder but may also include an air bag, a hydraulic cylinder, an electrical motor, a solenoid, or other suitable force-producing member. Actuator 30 may be oriented in any direction with suitable linkage provided to produce a vertical reciprocating motion as will be described in more detail below.

In operation, when it is desired to accumulate objects traveling along accumulation conveyor 10, the actuators 30 downstream of the point of accumulation are operated in order to lift the adjacent ends 26, 28 of the adjacent longitudinal members 18. The actuators 30 upstream of the point of accumulation are not operated which results in the ends of the ends 26, 28 of the longitudinal members 18 being retracted below conveying surface 12. In this manner, with end 26 retracted, but end 28 elevated, brake surface 16 of longitudinal member 18 in zone C is sloping upwardly. Therefore, an object contacting brake surface 16 will do so gradually, not abruptly. Product sensors 32 spaced along belt accumulation conveyor 10 sense the presence of objects on conveying surface 12 in order to determine when a zone is full and that zone should be actuated in order to elevate the actuator member for that zone. For example, sensor 32 may sense the object in zone C and operates the upstream actuator to fully elevate the brake surface in zone C. Object sensor 32 may be of any conventional type, including an electrical photo-eye, a pneumatic valve actuated by a mechanical sensor, a proximity sensor, or the like. A control system (34) receives the inputs from sensors 32 and selectively actuates actuator 30. The accumulation zones may be controlled individually or collectively by a programmable controller, or other such control, which receives object position information from object sensors 32. The object sensors are preferably either see-across or reflective-type photo sensors. There may be more than one object sensor 32 for each accumulation zone if the controller requires more data for decision making. For example, if objects are very small and light, and will not be damaged by bumping each other, more than one may be held in each accumulation zone. The control system may include an accumulation mode in which the control raises a zone to stop objects that arrive at that zone. Objects are held there until the release mode is activated. In the release mode, the control system releases suspended objects by lowering the zone below belt level. This can be done one zone at a time, two zones at a time, or multiple zones can be lowered to release a slug of objects at a time. In a through-put mode, none of actuators 30 are operated. The control system may alternatively be a pneumatic control system of the type disclosed in U.S. Pat. No. 5,191,967 for a CONVEYOR SYSTEM HAVING NON-SINGULATING ACCUMULATION CONVEYOR, the disclosure of which is hereby incorporated herein by reference. The control system 34 may also be an electro-mechanical control, an electronic control, a hydraulic control, or the like.

As best seen by reference to FIG. 7, adjacent ends 26, 28 may be mutually elevated by an articulation joint 36. One adjacent end 26, 28 is guided in vertical reciprocating motion under the force of actuator 30 (not shown in FIG. 7) by a fore and aft restraint 37 such as a guide pin 38. Articulation joint 36 includes a flange member 40 joined with end 26, a flange member 41 joined with end 28, and a member 44. Member 44 is attached to flange member 41, but not flange member 40, which allows limited fore and aft motion between the flange members.

In an alternative embodiment, a belt accumulation conveyor 10' includes a conveying surface 12' defined by the upper surface of a driven endless conveying member 14' (FIG. 6). A plurality of elongated longitudinal members 18' selectively raise portions of endless conveying member 14'. The upper portion of elongated longitudinal member 18' in contact with endless conveying member 14' includes an anti-friction means, such as roller members, or an anti-friction slip surface. Belt accumulation conveyor 10' further includes a brake surface 16', which is stationary. When it is desired for an object to be conveyed along accumulation conveyor 10', longitudinal members 18' are actuated in order to raise endless conveying member 14' above stationary brake surface 16'. When it is desired to accumulate objects in a particular zone, the actuators (not shown) at the downstream end of that zone is deactuated in order to retract the downstream end of the longitudinal member which causes objects to contact brake surface 16'. As zones fill up, the upstream actuators are deactuated in sequence upstream of object movement in order to retract the longitudinal members and, hence, the conveying member. Conversely, when it is decided to discharge the objects, the actuators are operated, beginning at the downstream end of the conveyor, in order to discharge objects.

A preferred embodiment of a belt accumulation conveyor 10" is shown with three zones, zones X, Y and Z, with zone Z being a discharge zone (FIGS. 8–14). Zone Y includes an actuator 30" at upstream end 26 thereof which elevates end 26 of zone Y and discharge end 28 of zone X. Zone Z includes an upstream actuator 30" for elevating upstream end 26 of zone Z and downstream end 28 of zone Y. Zone Z includes a second actuator 30" at its downstream end 28 in order to serve as a discharge control actuator. This second actuator for zone Z elevates downstream end 28 of zone Z in order to accumulate objects on conveyor 10" and is deactuated in order to discharge objects therefrom.

Each actuator 30" includes a torque tube 42 which extends the lateral width of the conveyor and includes a cam follower 44 mounted on a lever arm thereof and received in a channel 46 of brake assembly 15" (FIG. 9). This cam follower and channel interface are provided on opposite lateral sides of the brake assembly in order to provide uniform elevation of the end 26 of the brake assembly. A pair of downward extending flange members 48 straddle torque tube 42 in order to provide a fore and aft restraint 37" to prevent fore and aft movement of brake assembly 15". A force-producing member, such as a pneumatic cylinder 50, is connected to torque tube 42 through a lever arm 52. In this manner, the extension of cylinder 50 rotates torque tube counterclockwise, as viewed in FIG. 10, which causes cam follower 44 to be elevated within channel 46. This causes channel 46, and, hence, the entire end 26 of brake assembly 10, to be elevated. Fore and aft restraint 37" prevents fore and aft movement during this motion. In order to lower end 26 of brake assembly 15" cylinder 50 is retracted which rotates torque tube 42 clockwise which results in a movement downward of channel 46 under the motion of cam follower 44 in order to lower end 26. Although a pneumatic cylinder 50 is illustrated as a force-producing member, alternatives include a pneumatic cylinder, an electrically operated solenoid, or an electrically operated motor, or the like.

Ends 26, 28 of adjacent brake assemblies 15" are articulated through an articulation joint 36" which includes a pair of pins 54 extending from end 28 of brake assembly 15" into a socket 56 in end 26 of the adjacent brake assembly 15". Of course, the location of pins 54 and sockets 56 could be reversed. Instead of a pin and socket, articulation joint 36" could be a ball and socket, a wheel and channel, or other means which allows limited fore and aft motion between the brake assemblies and limited pivotal motion between the brake assemblies while providing upward force transfer from one brake assembly to the other.

As best seen by reference to FIGS. 13 and 14, elongated longitudinal members 18 include overlapping portions 58. The overlapping portions prevent thin objects from falling between the ends of longitudinal members 18 and reduce the tendency for objects being conveyed along the conveying surface from being caught on one end of longitudinal member 18. In the illustrated embodiment, overlapping portions 58 are in the form of multiple fingers which define a knuckle joint 60. This knuckle joint allows limited motion, both rotational and fore-to-aft between longitudinal members 18, while providing overlap between the members throughout such range of motion.

In the illustrative embodiment, endless conveying member 14 is a reinforced belt having an upper surface 62 and a downward extending lower guide member 64. In the embodiment illustrated in FIG. 15, conveying member 14 is supported for low-friction translational motion by a pair of rollers 66 which are rotatably supported by a vertical strut 68. Rollers 66 straddle guide member 64 and thereby maintain alignment of endless conveying member 14. In the embodiment illustrated in FIG. 16, an endless conveying member 14" includes a high-friction upper surface 62 and a low-friction lower surface 70. The endless conveying member 14" is guided by a support member 72, which includes a central channel 74. Endless conveying member 14" is supported for lateral motion by support 72 with guide member 64 riding in channel 74 in order to maintain lateral alignment of the belt. Low-friction surface 72 glides across the upper surface of support 72. In the illustrated embodiment, support 72 is formed from steel. It may be desirable to apply a low-friction coating, such as PTFE, to the upper surface of support 72.

In the illustrated embodiment, belt accumulation conveyor 10, 10', 10" is supplied in widths of from 18 inches, comprising four belts and five longitudinal members for each zone, up to 36-inch wide zones comprising eight belts and nine longitudinal members. In an activated position, endless conveying members 14, 14' are approximately ¼ inch above longitudinal members 18. In an accumulation position, elongated longitudinal members 18 extend approximately ¼ inch above endless conveying members 14, 14'. The zones are approximately three feet in length. Line speed is between approximately 200 feet per minute and approximately 300 feet per minute.

The present invention provides a unique belt accumulation conveyor which is capable of handling an exceptionally large range of product sizes, shapes and packaging without marking, marring, scratching, rubbing, crushing, smearing, or otherwise defacing or dog-earing the outer surface of the object or packaging. The present invention provides a belt accumulation conveyor which is capable of operation under both incline and decline angles of up to approximately 10 degrees, or greater.

Variations of the invention will suggest themselves to those of ordinary skill in the art. For example, although the invention is illustrated with an actuator at one end of each zone coupled to the opposite end of an adjacent zone by an articulation joint, it would be possible to utilize two coordinated actuators at adjacent ends of adjacent zones in order to jointly elevate adjacent ends thereof. Other means for connecting adjacent ends of zones will also be apparent to those of ordinary skill in the art.

Changes and modifications in the specifically described embodiments can be carried out without departing from the principles of the invention which is intended to be limited only by the scope of the appended claims, as interpreted according to the principles of patent law including the doctrine of equivalents.

The embodiments of the invention in which an exclusive property or privilege is claimed are defined as follows:

1. An accumulation conveyor, comprising:
    at least one driven endless conveying member defining an upper conveying surface;
    at least one brake surface lateral of said conveying member;
    a plurality of elongated longitudinal members arranged in tandem defining a plurality of accumulation zones, each of said longitudinal members vertically reciprocating a portion of said at least one brake surface in order to selectively raise said portion above said conveying surface to thereby accumulate objects in that zone and to selectively lower said portion below said conveying surface to thereby convey objects in that zone; and
    a plurality of actuators, each operatively connected with adjacent ends of adjacent ones of said longitudinal members in order to selectively raise and lower said adjacent ends together, wherein each of said actuators includes a member captured in a channel and a device to rotate said member about an axis.

2. The accumulation conveyor in claim 1 wherein said at least one driven endless conveying member comprises a plurality of driven endless conveying members and wherein said at least one brake surface comprises a plurality of brake surfaces interlaced with said plurality of driven endless conveying members.

3. The accumulation conveyor in claim 2 wherein said plurality of brake surfaces are joined together in a brake assembly to operate in unison.

4. The accumulation conveyor in claim 1 wherein said adjacent ends are articulated in a manner which accommodates limited fore and aft movement of adjacent longitudinal members.

5. The accumulation conveyor in claim 1 including a plurality of object sensors for sensing objects on said conveying surface for selectively operating said actuators order to selectively accumulate objects along said conveyor.

6. The accumulation conveyor in claim 5 wherein said actuators are pneumatically operated.

7. The accumulation conveyor in claim 1 wherein said actuators are pneumatically operated.

8. The accumulation conveyor in claim 5 including at least one of said object sensors associated with each of said zones.

9. The accumulation conveyor in claim 1 wherein said driven endless conveying member is a belt.

10. The accumulation conveyor in claim 1 wherein said driven endless conveying member is a padded chain.

11. The accumulation conveyor in claim 1 wherein each of said actuators includes a fore-and-aft restraint for said longitudinal members.

12. The accumulation conveyor in claim 1 wherein said device includes a lever arm pivoted at said axis, said member mounted at one end of said lever arm and a force producing member at the other end of said lever arm.

13. The accumulation conveyor in claim 1 including another member captured in another channel laterally spaced from said channel and another device to rotate said another member about said axis.

14. The accumulation conveyor in claim 13 including a torque tube interconnecting said devices for coordinated movement.

15. The accumulation conveyor in claim 14 including a fore-and-aft restraint for said longitudinal members.

16. The accumulation conveyor in claim 15 wherein said fore-and-aft restraint includes a pair of flanges extending from the associated longitudinal member and straddling said torque tube.

17. An accumulation conveyor, comprising:
    at least one driven endless conveying member defining an upper conveying surface;

at least one brake surface lateral of said conveying member;

a plurality of elongated longitudinal members arranged in tandem defining a plurality of accumulation zones, each of said longitudinal members vertically reciprocating a portion of said at least one brake surface in order to selectively raise said portion above said conveying surface to thereby accumulate objects in that zone and to selectively lower said portion below said conveying surface to thereby convey objects in that zone, wherein each of said longitudinal members includes a portion which longitudinally overlaps with a portion of an adjacent one of said longitudinal members; and a plurality of actuators, each operatively connected with adjacent ends of adjacent ones of said longitudinal members in order to selectively raise and lower said adjacent ends together.

18. The accumulation conveyor in claim 17 wherein said overlapping portions are defined by a knuckle joint having a series of interlaced fingers.

19. An accumulation conveyor, comprising:

a frame;

at least one driven endless conveying member extending substantially the longitudinal length of said frame, the upper surface of said conveying member defining a conveying surface;

a plurality of brake assemblies arranged longitudinally in tandem along said frame, each of said brake assemblies defining an accumulation zone, each of said brake assemblies defining at least two longitudinally elongated brake surfaces on opposite lateral sides of said at least one driven endless conveying member; and a control system which senses objects on said conveying surface and selectively elevates adjacent ends of adjacent ones of said brake assemblies in order to elevate the brake surfaces of said adjacent brake assemblies above said conveying surface and thereby accumulate objects in the zones defined by said adjacent brake assemblies;

wherein said control system includes an actuator for elevating one of said adjacent ends and wherein said adjacent brake assemblies are joined by an articulation joint in order to elevate the other of said adjacent ends, wherein said articulation joint includes a pin on one of said adjacent brake assemblies engaging a collar on the other of said adjacent brake assemblies.

20. An accumulation conveyor, comprising:

a frame;

at least one driven endless conveying member extending substantially the longitudinal length of said frame, the upper surface of said conveying member defining a conveying surface;

a plurality of brake assemblies arranged longitudinally in tandem along said frame, each of said brake assemblies defining an accumulation zone, each of said brake assemblies defining at least two longitudinally elongated brake surfaces on opposite lateral sides of said at least one driven endless conveying member; and a control system which senses objects on said conveying surface and selectively elevates adjacent ends of adjacent ones of said brake assemblies in order to elevate the brake surfaces of said adjacent brake assemblies above said conveying surface and thereby accumulate objects in the zones defined by said adjacent brake assemblies;

wherein said control system includes an actuator for elevating one of said adjacent ends and wherein said adjacent brake assemblies are joined by an articulation joint in order to elevate the other of said adjacent ends, wherein each of said actuators includes a member captured in a channel mounted to the associated brake assembly and a device to rotate said member about an axis.

21. The accumulation conveyor in claim 20 wherein said device includes a lever arm pivoted at said axis, said member mounted at one end of said lever arm and a force-producing member at the other end of said lever arm.

22. The accumulation conveyor in claim 20 including another member captured in another channel mounted to the associated brake assembly laterally spaced from said channel and another device to rotate said another member about said axis.

23. The accumulation conveyor in claim 22 including a torque tube interconnecting said devices for coordinated movement.

24. The accumulation conveyor in claim 23 including a fore-and-aft restraint for said longitudinal members.

25. The accumulation conveyor in claim 24 wherein said fore-and-aft restraint includes a pair of flanges extending from the associated longitudinal member and straddling said torque tube.

26. An accumulation conveyor, comprising:

a frame;

at least one driven endless conveying member extending substantially the longitudinal length of said frame, the upper surface of said conveying member defining a conveying surface;

a plurality of brake assemblies arranged longitudinally in tandem along said frame, each of said brake assemblies defining an accumulation zone, each of said brake assemblies defining at least two longitudinally elongated brake surfaces on opposite lateral sides of said at least one driven endless conveying member, wherein each of said brake surfaces includes a portion which longitudinally overlaps with a portion of said brake surface on an adjacent one of said brake assemblies; and a control system which senses objects on said conveying surface and selectively elevates adjacent ends of adjacent ones of said brake assemblies in order to elevate the brake surfaces of said adjacent brake assemblies above said conveying surface and thereby accumulate objects in the zones defined by said adjacent brake assemblies.

27. The accumulation conveyor in claim 26 wherein said overlapping portions are defined by a knuckle joint having a series of interlaced fingers.

28. The accumulation conveyor in claim 26 wherein said at least one driven endless conveying member includes a plurality of spaced apart driven endless conveying members and wherein said at least two longitudinally elongated brake surfaces includes at least the same number as said plurality of conveying members, said brake surfaces being interlaced with said conveying members.

29. The accumulation conveyor in claim 26 wherein said control system includes a plurality of photodetectors, at least one photodetector for sensing objects at each of said zones, a plurality of pneumatic actuators, each actuator for selectively elevating adjacent ends of adjacent ones of said brake frames in order to elevate the brake surfaces of said adjacent brake frames above said conveying surface, and an electrical controller for operating said pneumatic actuators in response to inputs from said photodetectors.

30. An accumulation conveyor adapted to convey individual packages of goods, comprising:
   a frame;
   a plurality of driven endless conveying members spaced laterally across said frame, each extending substantially the longitudinal length of said frame, the upper surface of said conveying members defining a conveying surface, wherein each of said conveying members is one of a belt and a padded chain;
   a plurality of brake assemblies arranged longitudinally in tandem along said frame, each of said brake assemblies defining an accumulation zone, each of said brake assemblies comprising a unitary member made up of at least three parallel spaced apart brake members each defining a brake surface joined at opposite ends of said brake members by end members, wherein said brake surfaces are interlaced with said conveying members;
   wherein adjacent said ends of adjacent ones of said brake assemblies are joined by an articulation joint so that said adjacent ends are elevated in unison; and
   a control system which senses packages on said conveying surface and selectively operates a plurality of actuators, each actuator for elevating one of said adjacent ends of adjacent brake assemblies in order to elevate the brake surfaces of said adjacent brake assemblies above said conveying surface and thereby accumulate packages in the zones defined by said adjacent brake assemblies;
   wherein said actuators concurrently elevate opposite sides of each said unitary member in unison, wherein all of said brake surfaces of that unitary member are elevated together.

31. An accumulation conveyor, comprising:
   a frame;
   a plurality of driven endless conveying members spaced laterally across said frame, each extending substantially the longitudinal length of said frame, the upper surface of said conveying members defining a conveying surface;
   a plurality of brake assemblies arranged longitudinally in tandem along said frame, each of said brake assemblies defining an accumulation zone, each of said brake assemblies defining a plurality of brake surfaces interlaced with said conveying members;
   wherein adjacent ends of adjacent ones of said brake assemblies are joined by an articulation joint so that said adjacent ends are elevated in unison, wherein said articulation joint includes a pin on one of said adjacent brake assemblies engaging a collar on the other of said adjacent brake assemblies; and
   a control system which senses objects on said conveying surface and selectively operates a plurality of actuators, each actuator for elevating one of said adjacent ends of adjacent brake assemblies in order to elevate the brake surfaces of said adjacent brake assemblies above said conveying surface and thereby accumulate objects in the zones defined by said adjacent brake assemblies.

32. An accumulation conveyor, comprising:
   a frame;
   a plurality of driven endless conveying members spaced laterally across said frame, each extending substantially the longitudinal length of said frame, the upper surface of said conveying members defining a conveying surface;
   a plurality of brake assemblies arranged longitudinally in tandem along said frame, each of said brake assemblies defining an accumulation zone, each of said brake assemblies defining a plurality of brake surfaces interlaced with said conveying members;
   wherein adjacent ends of adjacent ones of said brake assemblies are joined by an articulation joint so that said adjacent ends are elevated in unison; and
   a control system which senses objects on said conveying surface and selectively operates a plurality of actuators, each actuator for elevating one of said adjacent ends of adjacent brake assemblies in order to elevate the brake surfaces of said adjacent brake assemblies above said conveying surface and thereby accumulate objects in the zones defined by said adjacent brake assemblies;
   wherein each of said actuators includes a pair of members captured in respective laterally spaced apart channels on the associated brake assembly, a device to rotate each of said members about an axis and a torque tube interconnecting said devices along said axis for coordinated movement.

33. The accumulation conveyor in claim 32 wherein each of said devices includes a lever arm pivoted at said axis, the associated member mounted at one end of the respective lever arm, and a force-producing member at the other end of one of said lever arms.

34. The accumulation conveyor in claim 32 including a fore-and-aft restraint for said longitudinal members.

35. The accumulation conveyor in claim 34 wherein said fore-and-aft restraint includes a pair of flanges extending from the associated longitudinal member and straddling said torque tube.

36. An accumulation conveyor, comprising:
   a frame;
   a plurality of driven endless conveying members spaced laterally across said frame, each extending substantially the longitudinal length of said frame, the upper surface of said conveying members defining a conveying surface;
   a plurality of brake assemblies arranged longitudinally in tandem along said frame, each of said brake assemblies defining an accumulation zone, each of said brake assemblies defining a plurality of brake surfaces interlaced with said conveying members, wherein each of said brake surfaces includes a portion which longitudinally overlaps with a portion of said brake surface on an adjacent one of said brake frames;
   wherein adjacent ends of adjacent ones of said brake assemblies are joined by an articulation joint so that said adjacent ends are elevated in unison; and
   a control system which senses objects on said conveying surface and selectively operates a plurality of actuators, each actuator for elevating one of said adjacent ends of adjacent brake assemblies in order to elevate the brake surfaces of said adjacent brake assemblies above said conveying surface and thereby accumulate objects in the zones defined by said adjacent brake assemblies.

37. The accumulation conveyor in claim 36 wherein said overlapping portions are defined by a knuckle joint having a series of interlaced fingers.

38. The accumulation conveyor in claim 30 wherein each of said actuators resists fore-and-aft movement of said unitary member.

39. The accumulation conveyor in claim 30 wherein each of said actuators includes at least one cylindrical member, a mechanism for translating rotation of said at least one cylinder to elevating of the associated one of said adjacent ends and a mechanism for rotating said at least one cylindrical member.

40. The accumulation conveyor in claim 39 wherein each said actuators includes a pneumatic cylinder connected with said at least one cylindrical member by a lever which translates linear motion to rotational motion.

41. The accumulation conveyor in claim 39 wherein each of said actuators includes a pair of said cylindrical members on opposite sides of said unitary member, a torque tube interconnecting said cylindrical member for coordinated movement and a device to rotate said cylindrical members.

42. The accumulation conveyor in claim 30 wherein said articulation joint includes a pin on said end of one of said adjacent brake assemblies engaging a collar on said end of the other of said adjacent brake assemblies.

43. The accumulation conveyor in claim 30 wherein said actuators are pneumatically operated.

44. The accumulation conveyor in claim 30 including at least one of said object sensors associated with each of said zones.

45. The accumulation conveyor in claim 30 wherein said at least three braking members includes at least five braking members.

46. The accumulation conveyor in claim 30 wherein each of said actuators elevate said brake surfaces approximately one-quarter inch above said conveying members in order to accumulate packages of goods.

47. The accumulation conveyor in claim 17 wherein said at least one driven endless conveying member comprises a plurality of driven endless conveying members and wherein said at least one brake surface comprises a plurality of brake surfaces interlaced with said plurality of driven endless conveying members.

48. The accumulation conveyor in claim 47 wherein said plurality of brake surfaces are joined together in a brake assembly to operate in unison.

49. The accumulation conveyor in claim 17 wherein said adjacent ends are articulated in a manner which accommodates limited fore and aft movement of adjacent longitudinal members.

50. The accumulation conveyor in claim 17 including a plurality of object sensors for sensing objects on said conveying surface for selectively operating said actuators order to selectively accumulate objects along said conveyor.

51. The accumulation conveyor in claim 50 wherein said actuators are pneumatically operated.

52. The accumulation conveyor in claim 17 wherein said actuators are pneumatically operated.

53. The accumulation conveyor in claim 50 including at least one of said object sensors associated with each of said zones.

54. The accumulation conveyor in claim 17 wherein said driven endless conveying member is a belt.

55. The accumulation conveyor in claim 17 wherein said driven endless conveying member is a padded chain.

56. The accumulation conveyor in claim 17 wherein each of said actuators includes a fore-and-aft restraint for said longitudinal members.

57. The accumulation conveyor in claim 19 wherein said at least one driven endless conveying member comprises a plurality of driven endless conveying members and wherein said at least one brake surface comprises a plurality of brake surfaces interlaced with said plurality of driven endless conveying members.

58. The accumulation conveyor in claim 57 wherein said plurality of brake surfaces are joined together in a brake assembly to operate in unison.

59. The accumulation conveyor in claim 19 wherein said adjacent ends are articulated in a manner which accommodates limited fore and aft movement of adjacent longitudinal members.

60. The accumulation conveyor in claim 19 including a plurality of object sensors for sensing objects on said conveying surface for selectively operating said actuators order to selectively accumulate objects along said conveyor.

61. The accumulation conveyor in claim 60 wherein said actuators are pneumatically operated.

62. The accumulation conveyor in claim 19 wherein said actuators are pneumatically operated.

63. The accumulation conveyor in claim 60 including at least one of said object sensors associated with each of said zones.

64. The accumulation conveyor in claim 19 wherein said driven endless conveying member is a belt.

65. The accumulation conveyor in claim 19 wherein said driven endless conveying member is a padded chain.

66. The accumulation conveyor in claim 19 wherein each of said actuators includes a fore-and-aft restraint for said longitudinal members.

67. The accumulation conveyor in claim 19 wherein each of said actuators includes a member captured in a channel and a device to rotate said member about an axis.

* * * * *